(12) United States Patent
Sahay-Turner

(10) Patent No.: US 8,500,903 B2
(45) Date of Patent: Aug. 6, 2013

(54) PLASTER-BASED MATERIAL INCLUDING AN AGENT CAPABLE OF TRAPPING FORMALDEHYDE

(75) Inventor: Parnika Sahay-Turner, Selby (GB)

(73) Assignee: BPB Limited, Coventry (GB)

( * ) Notice: Subject to any disclaimer, the term of this patent is extended or adjusted under 35 U.S.C. 154(b) by 339 days.

(21) Appl. No.: 12/787,967

(22) Filed: May 26, 2010

(65) Prior Publication Data

US 2011/0113961 A1    May 19, 2011

(30) Foreign Application Priority Data

Nov. 16, 2009   (EP) ..................................... 09176123

(51) Int. Cl.
*C04B 11/00* (2006.01)
(52) U.S. Cl.
USPC .......................................... 106/772; 106/778
(58) Field of Classification Search
USPC .................................................. 106/772, 778
See application file for complete search history.

(56) References Cited

U.S. PATENT DOCUMENTS

| 3,950,295 A | | 4/1976 | Yamaguchi et al. |
| 4,152,408 A | * | 5/1979 | Winslow ....................... 423/555 |
| 5,051,283 A | | 9/1991 | Beane et al. |
| 5,160,679 A | | 11/1992 | Greene |
| 5,194,674 A | | 3/1993 | Pacific |
| 5,472,500 A | * | 12/1995 | Janicki ......................... 106/778 |
| 2006/0183879 A1 | | 8/2006 | Yamato et al. |

FOREIGN PATENT DOCUMENTS

| GB | 557562 | 11/1943 |
| JP | 10-337803 | 12/1998 |
| JP | 2002-145655 | 5/2002 |
| JP | 2003-245543 | 9/2003 |
| JP | 2007-296283 | 11/2007 |

OTHER PUBLICATIONS

JP 55085453 A Jun. 27, 1980 Central Glass Co. Japan abstract only.*
SU 221903 Oct. 9, 1971 Lyass et al. abstract only.*
GB 557562 Nov. 25, 1943 abstract only.*
Extended European Search Report issued May 11, 2010, in Patent Application No. 09176123.9.

* cited by examiner

*Primary Examiner* — Paul Marcantoni
(74) *Attorney, Agent, or Firm* — Oblon, Spivak, McClelland, Maier & Neustadt, L.L.P.

(57) ABSTRACT

The present invention relates to a plaster-based material which includes an agent capable of trapping formaldehyde, in particular a plasterboard intended for the interior fittings of residential buildings.
The agent capable of trapping formaldehyde is chosen from ethylene urea and its derivatives, compounds comprising active methylene(s), sulphites, tannins and their mixtures.
Another subject-matter of the invention is the use of the said material for reducing the amount of formaldehyde present in the atmosphere inside residential buildings.

11 Claims, No Drawings

PLASTER-BASED MATERIAL INCLUDING AN AGENT CAPABLE OF TRAPPING FORMALDEHYDE

The invention relates to a plaster-based material which includes an agent capable of trapping formaldehyde, in particular a plasterboard intended for the interior fittings of residential buildings.

Highly diverse composite materials are used in the field of the construction and equipping of buildings in general, in particular residential buildings or offices and public buildings (museums, cinemas, concert halls, and the like). Some of these materials, such as acoustic and/or thermal insulators, wood panels, furniture units or decorative items, use adhesives, paints and varnishes which comprise formaldehyde-based resins.

These resins are highly advantageous as they are inexpensive and have excellent performances. Their major disadvantage lies in the fact that they comprise free formaldehyde and consequently that they are capable of emitting formaldehyde over time.

In recent years, the proportion of formaldehyde in resins has greatly decreased due to the application of stricter regulations with regard to protection from undesirable emissions of volatile organic products which may exhibit a risk to the health of individuals. However, the attempts which have consisted in replacing the abovementioned resins with other formaldehyde-free resins have not been successful due to the very much higher cost and the poorer quality of the products obtained.

Nevertheless, it is still desirable for the content of formaldehyde in the ambient air of buildings for residential use to be as low as possible.

Means are known for achieving this aim.

The proposal has been made to include particles of photocatalytic titanium oxide in a paint or a plaster material (US-A-2005/0226761) or in paper or a textile, plastic or wooden material (EP-A-1 437 397).

JP-A-11128329 describes the use of an ammonium salt in an interior building material, such as a plasterboard.

JP-A-2002145655 provides for the inclusion of urea and/or melamine in a plasterboard.

JP-A-10337803 describes the incorporation of a hydrazine derivative in a plasterboard. The proposal is also made to include at least one hydrazide in combination a) with an inorganic absorbent in a plasterboard or in a decorative layer on wood (JP-A-2000103002), b) with silica gel in a plasterboard (JP-A-2004115340) or c) with an organic carbide (US-A-20040101695) in an interior building material.

The aim of the present invention is to reduce the content of formaldehyde inside buildings, in particular residential or public buildings, in order to improve the quality of the ambient air.

To achieve this aim, the present invention provides a plaster-based material, in particular a plasterboard, which comprises an agent capable of trapping formaldehyde chosen from ethylene urea and its derivatives, compounds comprising active methylene(s), sulphites, tannins and their mixtures.

Another subject-matter of the invention is the use of the said plaster-based material for reducing the amount of formaldehyde in the air inside buildings.

The ethylene urea derivatives according to the invention are preferably chosen from N-hydroxyethylene urea, N-aminoethylethylene urea, N-[(3-allyloxy-2-hydroxypropyl)aminoethyl]ethylene urea, N-acryloyloxyethyl-ethylene urea, N-methacryloyloxyethylethylene urea, N-acryloylaminoethyl-ethylene urea, N-methacryloylaminoethylethylene urea, N-methacryloyloxy-acetoxyethylene urea, N-methacryloyloxyacetaminoethylethylene urea and N-di(3-allyloxy-2-hydroxypropyl)aminoethylethylene urea. Ethylene urea is preferred.

The compounds comprising active methylene(s) according to the invention preferably correspond to the following formula (I):

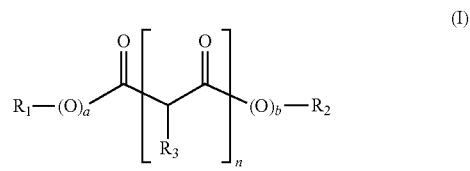

in which:
R$_1$ and R$_2$, which are identical or different, represent a hydrogen atom, a C$_1$-C$_{20}$, preferably C$_1$-C$_6$, alkyl radical, an amino radical or a radical of formula

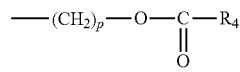

in which R$_4$ represents a radical

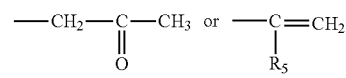

where R$_5$=H or —CH$_3$
and p is an integer varying from 1 to 6
R$_3$ represents a hydrogen atom, a C$_1$-C$_{10}$ alkyl radical, a phenyl radical or a halogen atom
a is equal to 0 or 1
b is equal to 0 or 1
n is equal to 1 or 2

The compound of formula (I) which is particularly preferred is acetoacetamide (R$_1$=—CH$_3$; R$_2$=—NH$_2$; R$_3$=H; a=0; b=0; n=1).

The sulphides according to the invention are, for example, ammonium bisulphite, potassium bisulphite, sodium bisulphite and alkali metal, in particular sodium, or alkaline earth metal metabisulphites. Sodium bisulphite is preferred.

The tannins according to the invention can be non-condensed or condensed tannins, such as acacia (catechu), mimosa, quebracho, pine, pecan nut, hemlock wood and sumac tannins. Acacia tannins are preferred.

The agent capable of reacting with formaldehyde is a compound which covalently bonds to formaldehyde. For this reason, the formaldehyde is trapped in a lasting fashion in the plaster-based material and is not re-emitted into the ambient air.

The amount of agent capable of trapping formaldehyde to be used can vary to a large extent, for example from 0.001 to 5 parts by weight per 100 parts by weight of gypsum, preferably from 0.01 to 1 and advantageously from 0.02 to 0.2 part.

The plaster-based material can additionally comprise additives which improve the physicochemical properties of the final product and which make it possible to have good conditions of use. The said material can thus comprise the following additives in the following proportions by weight, expressed per 100 parts by weight of gypsum:

0.1-15 parts of an adhesion agent, the role of which is to increase the adhesion of the paper coating with the plaster, for example a starch, in particular pretreated with an acid, or a dextrin, 0.001-5 parts of a setting accelerator, for example calcium sulphate hydrate or potassium sulphate, 0.0001 to 1 part of a foaming agent, the role of which is to create pores in order to reduce the density of the final product, in particular of plasterboards. Mention may be made, by way of example, of sodium lauryl sulphate.

The manufacture of plaster panels, in particular a plasterboard, is known per se.

Although the invention is more particularly described with regard to plaster panels, it is not limited to this type of material and comprises plaster-based materials no matter the form thereof (powder, mortar, mastic).

The plasterboard is formed according to a continuous process which consists in mixing powdered calcined gypsum (calcium sulphate hemihydrate) with water to form a paste, which is continuously deposited between two sheets of paper. The product formed is formed or shaped, in order to obtain the desired thickness, and then it is continuously transported on a conveyor over a distance which allows the paste to achieve a level of hardening sufficient to be able to be cut into boards of predetermined length. The boards are subsequently dried in an oven in order to remove the excess water.

Conventionally, the powdered components of the paste comprise calcium sulphate hemihydrate ($CaSO_4.0.5H_2O$; calcined gypsum) and the optional additives described above. The calcined gypsum undergoes a hydration reaction in the presence of water and is converted to calcium sulphate dihydrate ($CaSO_4.2H_2O$; gypsum).

The amount of calcined gypsum employed to form the paste varies according to the nature of the panel to be manufactured, generally from 30 to 100 parts by weight per 100 parts by weight of water, preferably from 60 to 80 parts.

The thickness of the panel can vary to a large extent, for example from 6 to 25 mm.

The agent capable of trapping formaldehyde can be introduced into the plasterboard in various ways.

According to a first embodiment, the agent capable of trapping formaldehyde is added to the calcined gypsum paste before the latter is deposited between the sheets of paper.

The addition of the agent capable of trapping formaldehyde can take place during the manufacture of the paste, for example by simultaneously or successively introducing the calcined gypsum and the said agent into the water, or after the paste has been obtained. The simultaneous addition of the abovementioned constituents is preferred as it is easier to carry out.

This embodiment makes it possible to have a homogeneous distribution of the agent capable of trapping formaldehyde in the plaster body and thus a uniform content throughout the thickness of the board.

According to a second embodiment, the agent capable of trapping formaldehyde is added to the paper sheet or sheets used as covering. The addition can take place during the manufacture of the paper, for example to the suspension of cellulose fibres or after the obtaining of the sheet.

The plaster-based material in accordance with the present invention can be provided in the form of a powder (plaster, mortar), of a paste (mastic, pointing material) or of a plaster panel. As regards more particularly the plaster panel, the latter can be a bare board or a board covered over at least one of its faces with a paper sheet, an acoustic panel comprising perforations, a panel of plaster and of mineral or wood wool, or a board reinforced with fibres or a fabric.

The plaster-based material in accordance with the invention can be used on walls, ceilings and floors, in particular for covering or pointing plaster or cement panels, or, as regards panels, to form facings, partitions and false ceilings.

The use of the plaster-based material inside a building makes it possible to reduce the amount of formaldehyde present in the atmosphere, which, for this reason, is thus decontaminated.

The examples which follow make it possible to illustrate the invention without, however, limiting it.

EXAMPLES 1 TO 4 a) Manufacture of the Plaster-based Material 600 g of calcium sulphate hemihydrate, the agent capable of trapping formaldehyde, 3 g of starch, 1.8 g of ground gypsum (accelerator) and 630 g of water are introduced into a mixer.

The agent capable of trapping formaldehyde is as follows:
ethylene urea (14 mg): Example 1
acetoacetamide (15 mg): Example 2
sodium bisulphite (16 mg): Example 3
acacia tannin (115 mg): Example 4

The mixture is stirred for 30 seconds in order to obtain a paste.

The paste is poured into a brass mould (150 mm×100 mm) covered internally on its bottom face with a paper sheet and then a second paper sheet, cut to the dimensions of the mould, is applied to the paste. The two paper sheets were conditioned beforehand for 24 hours in a chamber having an atmosphere maintained at a relative humidity of 90%.

After solidification, the plasterboard is removed from the mould. It is dried in an oven under the following conditions: at 180° C. until 80% of the water has been removed, at 60° C. for 12 hours and at 40° C. for 24 hours.

A plasterboard not comprising agent capable of trapping formaldehyde (Reference) is prepared under the same conditions.

b) Ability to Trap Formaldehyde

The ability to trap formaldehyde is measured in a gastight test chamber.

A sample of the plasterboard (2.5 g) is placed in the test chamber and then the chamber is hermetically closed. 2.4 µl of a 37% by weight aqueous formaldehyde solution are subsequently deposited in a container placed inside the chamber.

After 3 hours, the air present in the test chamber is extracted using a pump connected to a device for measuring formaldehyde (reactive tube sold by Gastec under the reference RAE 10-121-05; measurement range: 0.1 to 5 ppmv).

The results given in the following table correspond to a mean value based on a series of three samples of the same plasterboard.

|  | Formaldehyde (ppmv) | Reduction in the formaldehyde (%) |
| --- | --- | --- |
| Example 1 | 0 | 100 |
| Example 2 | 0 | 100 |
| Example 3 | 0.4 | 66.6 |
| Example 4 | 0.3 | 75.0 |
| Reference | 1.2 | — |

The invention claimed is:

1. A gypsum plaster comprising at least one agent that reacts with formaldehyde selected from the group consisting of ethylene urea and its derivatives, compounds comprising active methylene(s), sulphites, and their mixtures.

2. The gypsum plaster according to claim 1, wherein the gypsum plaster comprises at least one ethylene urea derivative selected from the group consisting of N-hydroxyethylene urea, N-aminoethylethylene urea, N-[(3-allyloxy-2-hydroxypropyl)aminoethyl]ethylene urea, N-acryloyloxyethylethylene urea, N-methacryloyloxyethylethylene urea, N-acryloylaminoethylethylene urea, N-methacryloylaminoethylethylene urea, N-methacryloyloxyacetoxyethylene urea, N-methacryloyloxyacetaminoethylethylene urea and N-di(3-allyl oxy-2-hydroxypropyl) amino ethylethylene urea.

3. The gypsum plaster according to claim 1, wherein the gypsum plaster comprises at least one compound comprising active methylene(s) corresponding to the following formula (I):

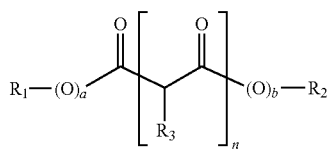

in which:

R1 and R2, which are identical or different, represent a hydrogen atom, a C1-C20 alkyl radical, an amino radical or a radical of formula

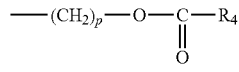

in which R4 represents a radical

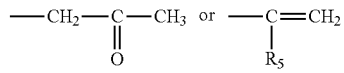

where $R_5$ =H or —$CH_3$
and p is an integer from 1 to 6
R3 represents a hydrogen atom, a C1-C10 alkyl radical, a phenyl radical or a halogen atom
a is equal to 0 or 1
b is equal to 0 or 1
n is equal to 1 or 2.

4. The gypsum plaster according to claim 3, wherein the gypsum plaster comprises acetoacetamide.

5. The gypsum plaster according to claim 1, wherein the gypsum plaster comprises at least one sulphite selected from the group consisting of ammonium bisulphite, potassium bisulphite, sodium bisulphite alkali metal metabisulphites, and alkaline earth metal metabisulphites.

6. The gypsum plaster according to claim 5, wherein the gypsum plaster comprises sodium bisulphite.

7. The gypsum plaster according to claim 1, wherein the amount of agent that reacts with formaldehyde is from 0.001 to 5 parts by weight per 100 parts by weight of gypsum.

8. The gypsum plaster according to claim 1, wherein it additionally comprises the following additives in the following proportions by weight, expressed per 100 parts by weight of gypsum:
0.1 - 15 parts of an adhesion agent,
0.0001 - 5 parts of a setting accelerator, and
0.0001 to 1 part of a foaming agent.

9. The gypsum plaster according to claim 3, wherein $R_1$ and/or $R_2$ is a $C_1$-$C_6$ radical.

10. The gypsum plaster according to claim 7, wherein the amount of agent that reacts with formaldehyde is from 0.01 to 1 part by weight per 100 parts by weight of gypsum.

11. The gypsum plaster according to claim 7, wherein the amount of agent that reacts with formaldehyde is from 0.02 to 0.2 part by weight per 100 parts by weight of gypsum.

* * * * *